Patented Dec. 19, 1950

2,534,243

UNITED STATES PATENT OFFICE 2,534,243

8-HALOXANTHINE SALTS OF 1-ARYL-1-PYR-IDYL - 3 - DIALKYLAMINOALKANES AND THE PRODUCTION THEREOF

John W. Cusic, Skokie, Ill., assignor to G. D. Searle & Co., Chicago, Ill., a corporation of Illinois No Drawing. Application November 4, 1949, Serial No. 125,660

12 Claims. (Cl. 260—253)

This invention relates to haloxanthine salts of 1 - aryl - 1 - pyridyl - 3 - dialkylaminoalkanes and to the production thereof. In particular it relates to 8-haloxanthine salts of organic bases of the following general structural formula

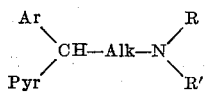

wherein Ar is an aryl radical, Pyr is a pyridyl radical, Alk is a lower alkylene radical, and R and R' are lower alkyl radicals, and wherein the 8-haloxanthine contains a hydrogen atom in position 7.

This application is a continuation-in-part of my copending application Serial No. 71,763, filed January 19, 1949.

In the foregoing structural formula, Ar represents aryl radicals such as phenyl, tolyl, xylyl, p-chlorophenyl, o-chlorophenyl, 2,4-dichlorophenyl, p - bromophenyl, p - methoxyphenyl, p-ethoxyphenyl, 2,4-dimethoxyphenyl and related monocyclic aromatic radicals. Pyr is a pyridyl radical such as α-pyridyl or γ-pyridyl. Alk is a lower alkylene radical and includes ethylene, propylene, trimethylene and butylene radicals, and R and R' are lower alkyl radicals such as methyl, ethyl, n-propyl, n-butyl, isobutyl and the like.

It is widely recognized that 1-aryl-1-pyridyl-3-dialkylaminoalkanes elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by 1-aryl-1-pyridyl-3-dialkylaminoalkanes are often severe enough to warrant reduced dosage or discontinuance of the medication.

It is the object of this invention to produce therapeutic compositions of matter which are relatively free from untoward reactions. A further object is to produce compositions of 1-aryl-1-pyridyl-3-dialkylaminoalkanes and haloxanthines of reduced toxicity. Another object is to produce compositions having enhanced therapeutic efficacy. Other objects will be apparent to those skilled in the art, in view of the disclosure given herein.

I have discovered that salts of 1-aryl-1-pyridyl - 3 - dialkylaminoalkanes with haloxanthines produce little effect on the central nervous system and are therapeutically more useful than any of the individual components alone. The salts of 1-aryl-1-pyridyl-3-dialkylaminoalkanes and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline, and related xanthines which have a hydrogen atom at position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the 1-aryl-1-pyridyl-3-dialkylaminoalkane are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid 1-aryl-1-pyridyl-3-dialkylaminoalkane and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the 1-aryl-1-pyridyl-3-dialkylaminoalkane. During the heating, ammonia is evolved and the haloxanthine salt of the organic base is formed. On chilling this salt precipitates.

The following examples illustrate in more detail my invention, but in no way are to be construed as limiting it in spirit or in scope. It will be apparent to those skilled in the art to which this invention pertains that numerous modifications in relative quantities of reagents, solvents, temperatures, and the like without departing from the spirit or scope of my invention. Similarly modifications in the haloxanthines or in the 1-aryl-1-pyridyl-3-dialkylaminoalkanes may be made without departure from this invention.

Example 1

6 g. of 1-α-pyridyl-1-phenyl-3-dimethylaminopropane and 5.3 g. of 8-chlorotheophylline are dissolved in 50 cc. of hot methyl ethyl ketone containing 2 cc. of water. The solution is then evaporated on the steam bath and the residue is dried in a desiccator. The solid 1-α-pyridyl-1-phenyl-3-dimethylaminopropane salt of 8-chlorotheophylline is triturated with ether, filtered and dried. It melts at 92–99° C.

Example 2

10 g. of 1-α-pyridyl-1-p-chlorophenyl-3-dimethylaminopropane

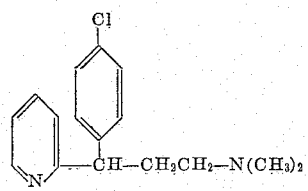

and 8 g. of chlorotheophylline are dissolved in a boiling mixture of 50 cc. of methyl ethyl ketone and 5 cc. of water. The hot solution is filtered and evaporated under reduced pressure. A sample of the residue of the 8-chlorotheophylline salt of 1-α-pyridyl-1-p-chlorophenyl-3-dimethylaminopropane showed on analysis 14.67% chlorine. The calculated value is 14.45%.

Example 3

6 g. of 1-α-pyridyl-1-phenyl-3-dimethylaminopropane and 6.4 g. of 8-bromotheophylline are reacted in 50 cc. of hot methyl ethyl ketone and 2 cc. of water as above. The resulting 1-α-pyridyl-1-phenyl-3-dimethylaminopropane 8-bromotheophylline salt is isolated as above. It melts at 73–85° C. A sample on analysis showed 16.84 and 16.90% nitrogen (calculated 16.83%).

Example 4

7 g. of 1-phenyl-1-α-pyridyl-3-diethylaminobutane

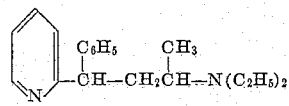

and 5 g. of 8-bromotheophylline are dissolved in a boiling mixture of 40 cc. of methyl ethyl ketone and 5 cc. of water. The hot solution is filtered and then evaporated under vacuum. The residue of the 8-bromotheophylline salt of 1-phenyl-1-α-pyridyl-3-diethylaminobutane is ground under ether, filtered and dried. A sample on assay showed 45.3% 8-bromotheophylline; the calculated value is 45.0%.

I claim:

1. An 8-haloxanthine salt of an organic base of the formula

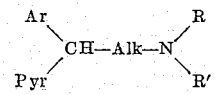

wherein Ar is a radical selected from the group consisting of phenyl and chlorophenyl radicals, Pyr is an α-pyridyl radical, Alk is a lower alkylene radical, and R and R' are lower alkyl radicals, and wherein the 8-haloxanthine contains a hydrogen atom in position 7.

2. An 8-haloxanthine salt of an organic base of the formula

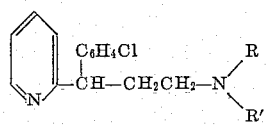

wherein R and R' are lower alkyl radicals, and wherein the 8-haloxanthine contains a hydrogen atom in position 7.

3. An 8-haloxanthine salt of an organic base of the formula

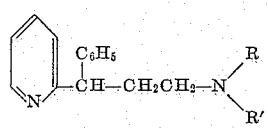

wherein R and R' are lower alkyl radicals, wherein the 8-haloxanthine contains a hydrogen atom in position 7.

4. An 8-halotheophylline salt of an organic base of the formula

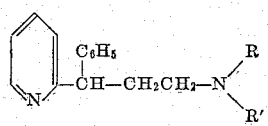

wherein R and R' are lower alkyl radicals.

5. An 8-halotheophylline salt of an organic base of the formula

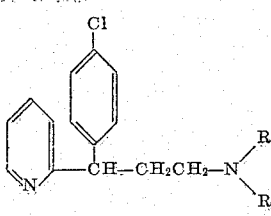

wherein R and R' are lower alkyl radicals.

6. The 8-chlorotheophylline salt of an organic base as in claim 4.

7. The 8-chlorotheophylline salt of an organic base as in claim 5.

8. The 8-chlorotheophylline salt of 1-phenyl-1-α-pyridyl-3-dimethylaminopropane.

9. The 8-chlorotheophylline salt of 1-p-chlorophenyl-1-α-pyridyl-3-dimethylaminopropane.

10. The process of producing an 8-haloxanthine salt of an organic base of the formula

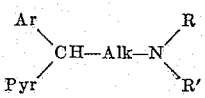

wherein Ar is a radical selected from the group consisting of phenyl and chlorophenyl radicals, Pyr is an α-pyridyl radical, Alk is a lower alkylene radical, and R and R' are lower alkyl radicals and wherein the 8-haloxanthine contains a hydrogen atom in position 7, which comprises reacting an 8-haloxanthine which contains a hydrogen atom in position 7 with an organic base of the foregoing formula in a water-miscible organic solvent and separating the salt from the solution.

11. The process of producing the 8-chlorotheophylline salt of 1-α-pyridyl-1-phenyl-3-dimethylaminopropane which comprises heating together 8-chlorotheophylline and 1-α-pyridyl-1-phenyl-3-dimethylaminopropane in methyl ethyl ketone and separating the salt thus formed.

12. The process of producing the 8-chlorotheophylline salt of 1-α-pyridyl-1-p-chlorophenyl-3-dimethylaminopropane which comprises heating together 8-chlorotheophylline and 1-α-pyridyl-1-p-chlorophenyl-3-dimethylaminopropane in methyl ethyl ketone and separating the salt thus formed.

JOHN W. CUSIC.

No references cited.